United States Patent [19]
Wiseman

[11] Patent Number: 5,291,182
[45] Date of Patent: Mar. 1, 1994

[54] FLUID FLOW DIRECTION DETECTOR

[76] Inventor: Brian Wiseman, 95 Fairmount Ave., Saugus, Mass. 01906

[21] Appl. No.: 764,808

[22] Filed: Sep. 24, 1991

[51] Int. Cl.5 .............................................. G08B 21/00
[52] U.S. Cl. .................... 340/610; 340/606; 116/112; 116/264; 116/273; 200/81.9 R; 307/118; 454/256
[58] Field of Search ............... 340/606, 610; 116/112, 116/264, 273; 200/81.9 R; 307/118; 454/194, 256

[56] References Cited

U.S. PATENT DOCUMENTS

| | | |
|---|---|---|
| 2,808,580 | 10/1957 | Fuller . |
| 3,192,470 | 6/1965 | Wadey . |
| 3,689,908 | 9/1972 | Ray . |
| 3,820,396 | 6/1974 | Garner et al. . |
| 3,962,918 | 6/1976 | Rosaen ........................... 200/81.9 R |
| 4,197,809 | 4/1980 | Johnson ............................... 340/610 |
| 4,486,744 | 12/1984 | Pratt et al. ............................ 340/606 |
| 4,774,676 | 9/1988 | Stenzel et al. . |
| 4,906,807 | 3/1990 | Siebert et al. ........................ 340/610 |
| 4,963,857 | 10/1990 | Sackett . |
| 5,142,271 | 8/1992 | Bailey et al. ........................ 340/606 |

*Primary Examiner*—John K. Peng
*Assistant Examiner*—Edward Lefkowitz
*Attorney, Agent, or Firm*—Wolf, Greenfield & Sacks

[57] ABSTRACT

An apparatus for detecting the flow direction of a fluid between two enclosed spaces, such as hospital rooms, includes a conduit extending along a horizontal plane and adapted to receive the fluid. A detecting element is disposed within the conduit and movable in the direction of fluid flow, the detecting element being in direct contact with the fluid. A sensing element is coupled to the conduit for determining when the detecting element reaches a predetermined position within the conduit. Circuitry coupled to the sensing element, enables selection of a desired flow direction and actuates an alarm when the detected flow direction is other than the one selected.

15 Claims, 5 Drawing Sheets

FLUID FLOW DIRECTION DETECTOR

FIELD OF THE INVENTION

This invention relates to sensing devices, and more particularly, to a device for detecting the directional flow of air into or out of a room and its adjoining spaces and for actuating an alarm upon the occurrence of an undesirable flow direction.

BACKGROUND OF THE INVENTION

The direction of air flow into or out of a room depends on the pressure of the room relative to its adjacent spaces. The differential pressure between the room and the adjacent spaces need only be slight, practically immeasurable, to create air flow. Rooms such as hospital operating rooms, patient isolations rooms, sterilization rooms, research laboratories, clean rooms, etc., often require directional air flow. For example, a patient isolation room, containing a patient who is susceptible to infection, is supplied with highly filtered air under positive pressure, i.e., clean air flows out of the room at all times, thereby preventing dirty or infectious air from entering the room. This is accomplished by supplying clean air to the patient's room at a greater flow rate than the rate at which air is exhausted from the room. Conversely, if the patient is infectious or the room contains toxins, the room should be kept under negative pressure, i.e, the rate at which potentially contaminated air is exhausted from the room is greater than the rate at which new air is supplied to the room.

In the above described environments, it is important that the proper direction of air flow be maintained. If the proper direction or air flow ceases, an alarm should be activated until the pressure condition in the room can be corrected.

Transducers are currently available that measure the differential pressure between a room and reference space and use of the resulting measurement for alarm actuation. A problem associated with these types of differential pressure sensors is that the room must be well sealed or "tight" in order to build up a measurable pressure. When a door or window is open for an appreciable period of time, the differential pressure of the room approaches zero causing the sensor to falsely actuate the alarm, despite the presence of directional air flow into or out of the room. Accordingly, there is a need for a device which can detect the directional air flow into or out of a room without relying on differential pressure measurements.

Another type of transducer currently available utilizes a "hot wire" anemometer to detect the directional velocity of air. Such transducers are an improvement over a differential pressure transducer. However, their accuracy is dependent upon the sensitivity and proper calibration of the transduction element and the associated processing circuitry.

Further, since neither air pressure nor air velocity can be seen, people often hang a piece of string or tissue in a doorway or in front of a vent to assess the direction of air flow into or out of a room and to verify the results of either differential pressure or anenometer type transducer.

Fuller U.S. Pat. No. 2,808,580; Wadney U.S. Pat. No. 3,192,470; Ray U.S. Pat. No. 3,689,908; Gamer et al. U.S. Pat. No. 3,820,396; Pratt et al. U.S. Pat. No. 4,486,744; Stenzel et al. U.S. Pat. No. 4,774,676; and Sackett U.S. Pat. No. 4,963,857; all disclose devices for detecting the presence and velocity of a fluid, typically a gas. However, none of these references disclose a device which allows the desired flow direction of a fluid to be selected and which actuates an alarm when the detected direction is other than the desired direction.

Accordingly, there exists a need for a device which allows the desired direction of air flow to be selected and visually monitored, and, which actuates an alarm when the detected direction is other than the one selected.

It is therefore an object of this invention to provide a device for detecting the presence and direction of air flow between two rooms or a room and its adjoining spaces.

Another object of the present invention is to provide a device which allows the desired direction of air flow to be selected.

A further object of the present invention is to provide a device which indicates when the detected direction of air flow is different from the selected direction of air flow.

Still another object of the present invention is to provide a device for detecting the presence and direction of air flow between a room and its adjoining spaces which does not require that the room be well sealed i.e., at near zero differential pressure.

A further object of the present invention is to provide a device for detecting the presence and direction of air flow whose accuracy does not depend primarily on the sensitivity and calibration of the transducer and associated processing circuitry.

Yet another object of the present invention is to provide a device for detecting presence and direction of air flow which allows for direct visual confirmation of the direction of air flow.

BRIEF SUMMARY OF THE INVENTION

The foregoing and other objects of the present invention are achieved with an apparatus for detecting the flow direction of a fluid comprising a conduit adapted to receive the fluid. A detecting element is disposed within the conduit and is movable in the direction of fluid flow. A sensing element, coupled to the conduit, determines when the detecting element reaches a predetermined position within the conduit.

In one embodiment of the present invention, the conduit comprises a cylindrical tube extending along a horizontal plane. The moving element comprises lightweight sphere disposed within the tube and translatable in the direction of fluid flow. In this embodiment, the sensing element comprises a pair of optical sensors disposed at opposite ends on the tube and within the path of the sphere.

In another embodiment, the conduit comprises a rectangularly shaped tube having a rectangular bore. The moving element comprises a flap pivotally coupled to the rectangular bore and deflectable in the direction of fluid flow. In this embodiment, the sensing element comprises a pair of optical sensors symmetrically positioned about the flap when undeflected.

In still another embodiment a circuit, coupled to the sensing element, indicates the direction of fluid flow through the conduit. The circuit includes elements for selecting the desired direction of the fluid flow and means for indicating when the detected flow direction is other than the one selected and for actuating an alarm when the detected direction is other than the one selected.

The invention will be more fully understood from the detailed description set forth below, which should be read in conjunction with the accompanying drawings. The invention is defined in the claims appended at the end of the detailed description, which is offered by way of example only.

DETAILED DESCRIPTION

Refer now to the drawings, particularly FIGS. 1-5B, there is shown an air flow direction detector 10 in accordance with a first embodiment of the present invention. In the illustrative embodiment, detector 10 extends transversely through a wall 12 or similar structure separating two rooms, such as hospital rooms, or a room and its adjoining enclosures. A room is considered to be any substantially enclosed space, although not necessarily a sealed or "tight" space. Detector 10 comprises housing sections 14A-B, tube 16, sphere 20, sensors 22 and 24, stop pins 26, control panel 78 and electrical circuits 30 and 60.

Figure 1:
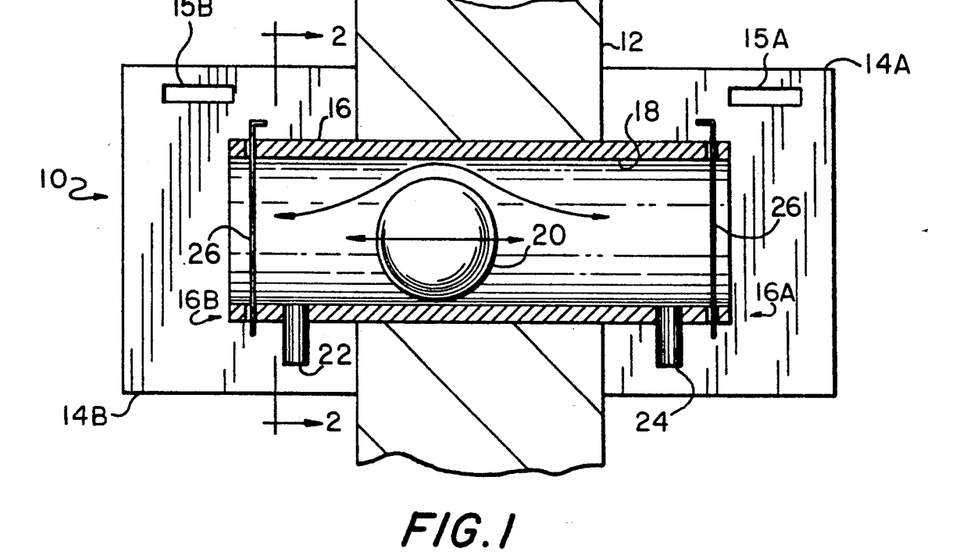
FIG. 1 is a side cut-away view of an air flow detector in accordance with a first embodiment of the present invention.

In the first embodiment of the present invention, tube 16 is an elongate cylinder having open ends 16A-B, as shown in FIG. 1. Tube 16 may have a length of approximately 8 inches. A bore 18 extends through tube 16. Bore 18 has a uniform diameter of approximately 1½ inches and a smooth surface to minimize the resistance between itself and sphere 20, as explained hereinafter. Tube 16 is formed from a rigid material, typically plastic, and may be transparent, translucent or opaque. Tube 16 extends through wall 12 along a horizontal level plane to avoid biasing the motion of sphere 20 in either direction as it moves through bore 18. A pair of stop pins 26 extend through aperatures in the wall of tube 16 and across the diameter of bore 18. Stop pins 26 prevent sphere 20 from exiting open ends 16A-B of tube 16 while still allowing unrestricted air flow through bore 18 diameter.

Sphere 20 is disposed in bore 18 of tube 16, as shown in FIGS. 1-4. Sphere 20 may be formed of a light weight material, such as plastic, and may have a hollow interior, similar to a ping-pong ball. The exterior surface of sphere 20 is smooth to minimize friction between itself and bore 18, allowing the sphere to traverse bore 18 in the presence of minimal air flow. The diameter of sphere 20 is approximately 80% of the diameter of bore 18.

Sensors 22 and 24 extend through the wall of tube 16 and are exposed to the interior of bore 18. The end surfaces of sensors 22 and 24 are flush with the surface of bore 18 to prevent interference with the motion of sphere 20 through the bore. Sensor 22 is located outside the room being controlled for proper pressurization and sensor 24 is located inside the room. Sensors 22 and 24 are coupled to circuits 30 and 60 and detect the presence of sphere 20, as explained hereinafter.

Figure 4:
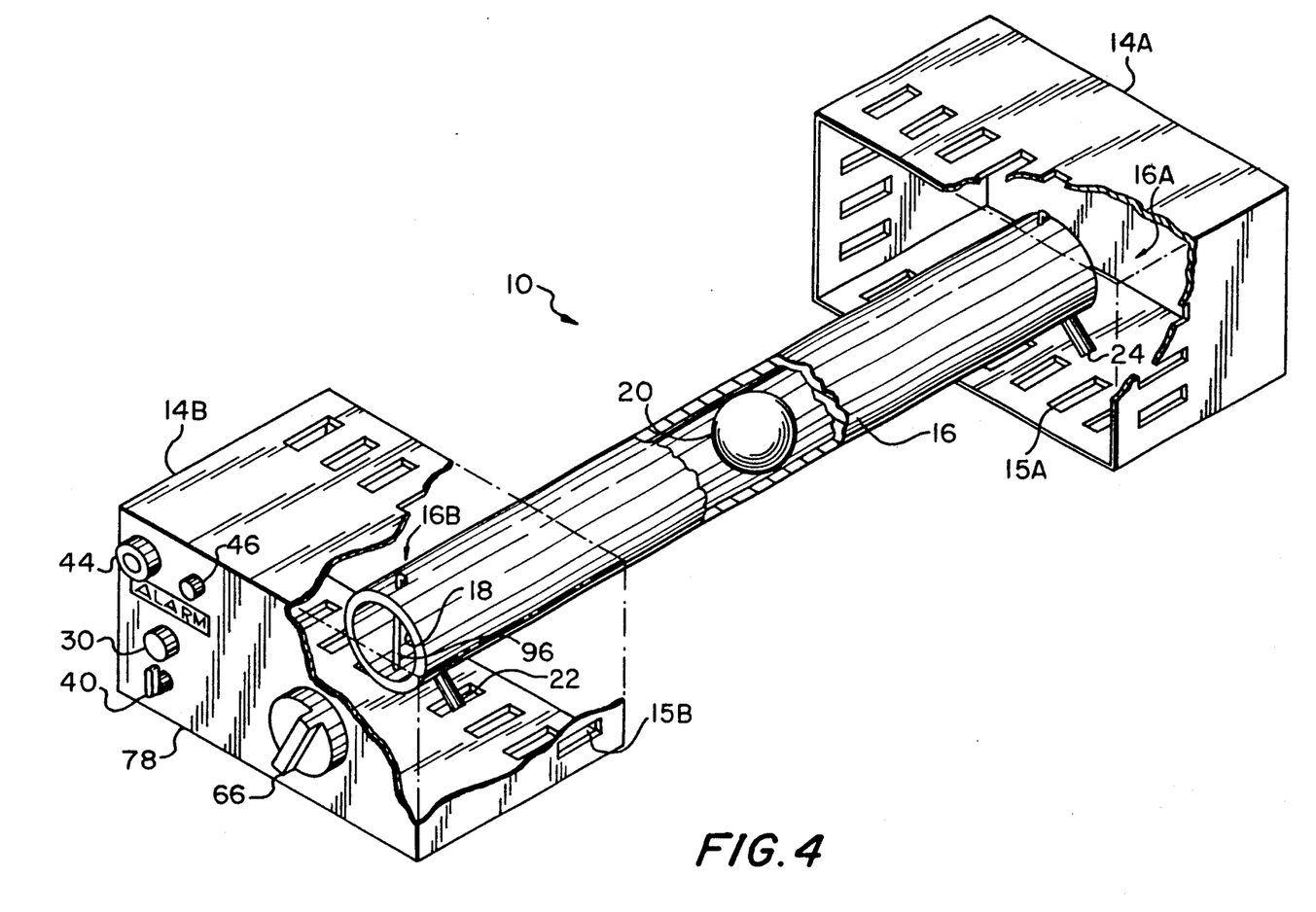
FIG. 4 is a perspective view of the air flow detector of FIG. 1.

Referring to FIGS. 1 and 4, end 16A of tube 16 projects from wall 12 into the room or enclosure in which the pressure is to be monitored. A substantially rectangular housing section 14A, shown transparent for purposes of viewing the position of sphere 20, surrounds end 16A and contains one or more apertures 15A which provide fluid communication between the room interior and tube 16. Housing section 14B, similar in construction to section 14A, surrounds end 16B of tube 16 where it protrudes from the opposite side of wall 12, as illustrated in FIG. 1. Control panel 78 is integrated to the front surface of housing section 14B to allow for visually monitoring the position of sphere 20 directly, the position of sphere 20 via LED 52 and LED 58, the status of an alarm condition and for changing the desired direction of air flow via switch 66. Control panel 78 can be located inside or outside the room being monitored. The room being monitored preferably has active supply and exhaust vents, i.e., fans are present in both vents.

Figure 5A:
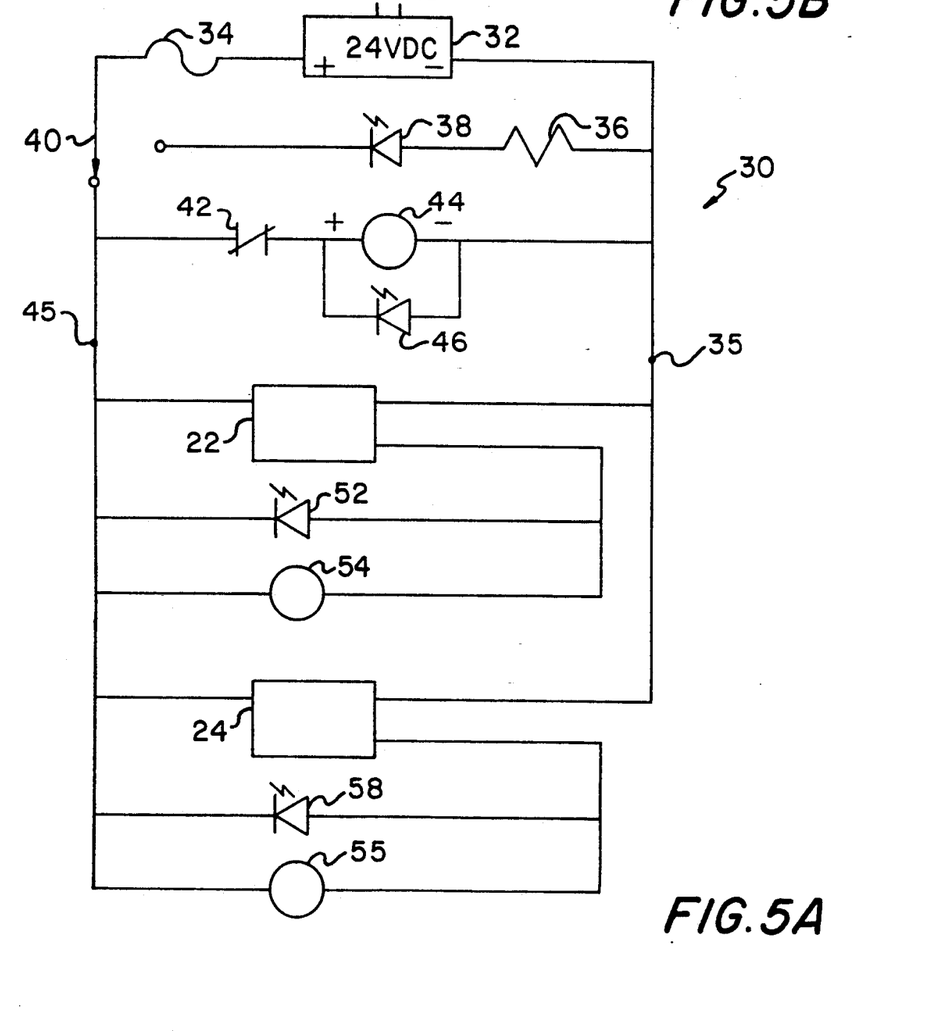
FIGS. 5A-B are electrical schematics of the circuitry of the air flow detector in accordance with the present invention.
Figure 5B:
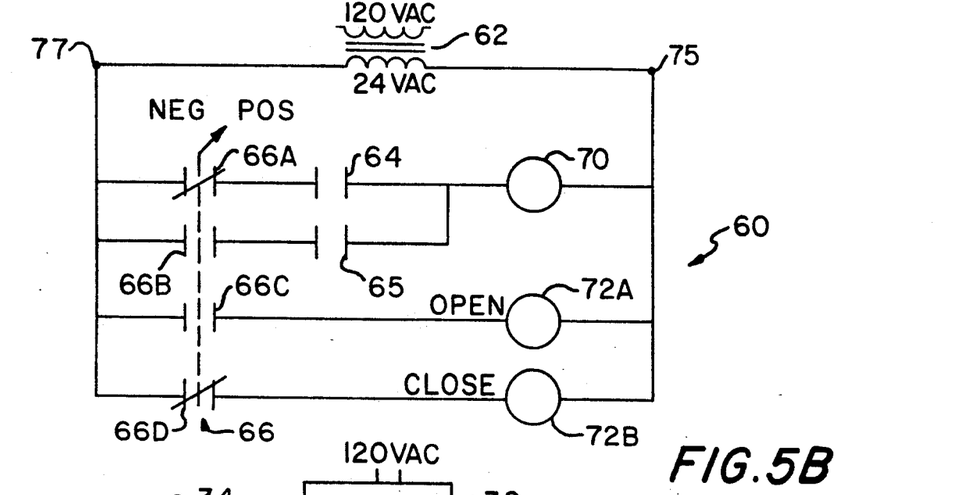

Referring to FIGS. 5A-B, the electrical circuits of air flow detector 10 are illustrated. Circuit 30 of FIG. 5A is a direct current circuit and includes a power supply 32 for converting a standard 120 volt AC line input into a 24 volt DC output. The positive terminal of power supply 32 is connected to the contact of a single-pole, double-throw (SPDT) switch 40 through a fuse 34. A first terminal of switch 40 is connected to a terminal of Light Emitting Diode (LED) 38, which may be a blinking-type LED. The other terminal of LED 38 is connected to the negative terminal of power supply 32 through a resistor 36. A second terminal of switch 40, hereinafter referred to as node 45, is connected to a first terminal of relay contact 42 of time delay relay coil 70 of circuit 60, as explained hereinafter. Relay contact 42 is normally in a closed position when relay coil 70 is not energized. A piezoelectric horn 44 and a light emitting diode 46 are connected in parallel between the second terminal of relay contact 42 and the negative terminal of power supply 32, hereinafter referred to as node 35. LED 46 may be red in color to indicate an alarm condition.

Figure 2:
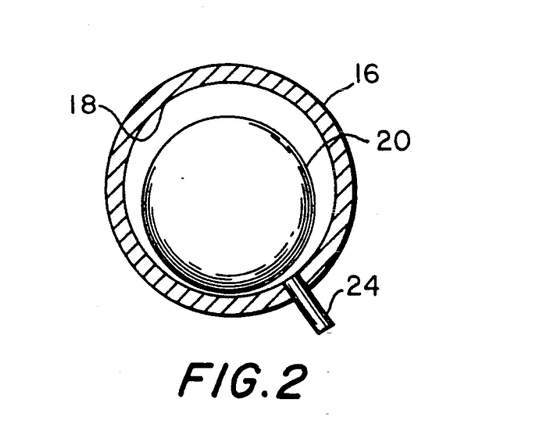
FIG. 2 is a cross-sectional view of the air flow detector of FIG. 1 as seen on line 2—2.

Sensors 22 and 24 are implemented, in the illustrative embodiment, with photoelectric diffuse sensors. Each of the photoelectric diffuse sensors includes an emitter and a receiver element in the same housing. The emitter sends out a beam of pulsed, infrared light which is reflected directly by sphere 20. When the beam hits the surface of sphere 20, it is diffused or scattered in all directions, with some of the light being reflected back to the receiver element of the sensor. The operating range of sensors 22 and 24 is dependent largely on the reflective properties of the surface of sphere 20. Each of the sensors includes a fiber optic cable adapter which is mounted through the wall of tube 16 and exposed to the interior of bore 18, as illustrated in FIGS. 1-2 and 4. A photoelectric diffuse sensor suitable for use as sensors 22 and 24 in the present invention is Model No. FZAN 18N 1005 commercially available from Baumer Electric, Southington, Conn. 06489.

Sensors 22 and 24 are three terminal devices, illustrated in FIG. 5A. A first terminal of sensor 22 is connected to node 45 while a second terminal thereof is connected to node 35. An LED 52 and first relay coil 54 are connected in parallel between node 45 and the third terminal of sensor 22. In the illustrative embodiment, LED 52 is green for indicating positive pressure i.e., directional airflow is out of the subject room. Sensor 24 similarly has a first terminal connected to node 45 and a second terminal connected to node 35. An LED 58 and second relay coil 55 are connected in parallel between node 45 and the third terminal of sensor 24. In the illustrative embodiment, LED 58 is yellow for indicating negative pressure i.e., directional airflow is into the subject room. DC circuit 30 is electrically isolated from AC circuit 60 but is mechanically coupled therewith by relay contacts 42, 64 and 65, as explained hereinafter.

As shown in FIG. 5B, AC circuit 60 includes a transformer 62 which transforms a 120 volt AC line voltage to 24 volts AC. One terminal of transformer 62, hereinafter referred to as node 77, is connected to a first terminal of each of contacts 66A-D of two-position rotary switch 66. Switch 66 is a double-pole, double-throw (DPDT) switch in which contacts 66A and 66D are closed when the switch is in the positive position, as illustrated in FIG. 5B. Contacts 66B-C are closed when switch 66 is in the negative position. The second terminal of contact 66A of switch 66 is connected to a first terminal of relay contact 64 of relay coil 54. The second terminal of contact 64 is connected to a first terminal of time delay relay coil 70. The second terminal of relay coil 70 is connected to a second terminal of transformer 62, hereinafter referred to a node 75. The second terminal of contact 66B of switch 66 is connected to a first terminal of relay contact 65 of second relay coil 55. The second terminal of relay contact 65 is connected to the first terminal time delay relay coil 70. As shown in FIG. 5B, relay contacts 64 and 65 are normally in an open position when relays 54 and 55 are not energized, respectively.

A second terminal of contact 66C is connected to a terminal of first (open) winding 72A of an exhaust damper motor (not shown) which is used to open or close a damper over an active exhaust vent of the room being monitored. A second terminal of the motor winding 72A is connected to node 75. The second terminal of contact 66D of switch 66 is connected to a terminal of a second (close) winding 72B of the exhaust damper motor. A second terminal of winding 72B is connected to node 75.

Figure 3:
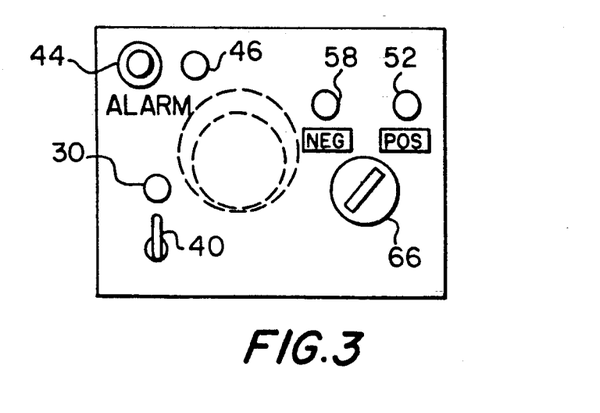
FIG. 3 is a front view of the control panel of the air flow detector of FIG. 1.

Control panel 78 of air flow detector 10 is illustrated in FIG. 3. Switches 40 and 66, LEDs 30, 46, 52 and 58, and alarm 44 are mounted on control panel 78 to select and indicate the selected mode and status of detector 10, as explained hereinafter. Some of the elements of circuits 30 and 60 may be mounted on a circuit board disposed behind control panel 78 which is formed integrally within the front surface of housing section 14B. Others, particularly power supply 32, transformer 62, and relays 54 and 55, may be located in a separate housing which is located remotely from detector 10 but which is electrically coupled to control panel 78.

The operation of detector 10 occurs as follows. The following initial powering of the circuits 30 and 60, the position of switch 66 is set to select the desired pressure conditions i.e. the direction of air flow into or out of the room of concern. For the purposes of illustration, switch 66 is set to the positive position, as indicated in FIG. 5B, indicating that the room is to be under positive pressure. In this mode, the desired direction of air flow is out of the room. Assuming that the room is currently under positive pressure, air will enter housing section 14A and flow through bore 18 of tube 16. The flow of air through bore 18 will overcome any rolling friction between sphere 20 and bore 18 and translate sphere 20 in the direction of sensor 22. Stop pin 26 will prevent sphere 20 from exiting tube end 16B and will retain sphere 20 in the proximity of sensor 22.

Referring to FIG. 5A, in the positive mode, the contact of switch 40 is connected to node 45 which supplies current to sensor 22, LED 52 and relay coil 54. Light irradiated from the emitter element in sensor 22 is partially reflected off the surface of the sphere 20 and into the receiver element of sensor 22, activating the sensor. Upon activation of sensor 22, LED 52 and first relay coil 54 are operatively coupled to node 35. Current flows through LED 52 illuminating the LED and indicating that the room is under positive pressure. Current also flows through first relay coil 54, energizing the coil. Upon energization of first relay coil 54, contact 64 of circuit 60, which is normally open, closes. Time delay coil 70 is then coupled to node 77 via contact 66A and contact 64, causing coil 70 to be energized. Upon energization of coil 70, contact 42 of circuit 30, which is normally closed, opens, thereby preventing horn 44 and LED 46 from being activated as long as sphere 20 is positioned at sensor 22.

As shown in FIG. 5B, winding 72B of the exhaust damper motor is coupled to node 75 and to node 77 by contact 66D when switch 66 is in the positive position. Winding 72B remains energized, as long as switch 66 is in the positive position, and causes the exhaust damper motor to remain closed, regardless of the position of sphere 20 within tube 16. In this manner, the fan in the exhaust vent will not actively draw air from the room. Thus, the supply air must exfiltrate the room.

If the direction of air flow through tube 16 reverses, i.e. the room becomes negative pressurized while switch 66 is still set to a positive mode, the following occurs. The flow of air through bore 18 causes sphere 20 to move away from sensor 22 and toward sensor 24. As sphere 20 leaves the proximity of sensor 22, the sensor becomes deactivated, effectively stopping the flow of current through LED 52 and relay 54, causing LED 52 to turn off and contact 64 to open via deenergizing relay 54. Sphere 20 may continue to move through bore 18 until it is stopped by pin 26 near sensor 24 at end 16A of tube 16. In such case, sensor 24 is then activated, operatively coupling LED 58 and second relay coil 55 to node 35. Current flows through LED 58 from node 45 to node 35 illuminating the LED and indicating the room is under negative pressure. Current also flows from node 45 to node 35 through second relay coil 55 energizing the coil. Upon energization of second relay coil 55, contact 65 of circuit 60, which is normally open, closes. Time delay coil 70 is then coupled to contact 66B of switch 60. However, since contact 66B is normally open when switch 66 is in the positive position, coil 70 is not connected to node 77. Hence, the coil 70 will not energize and contact 42 of circuit 30 will remain closed, operatively coupling horn 44 and LED 46 to node 45, causing activation thereof. Horn 44 will sound an alarm and LED 46 will illuminate red indicating that the direction of air flow is other than the one selected, i.e. positive pressure. Alarm 44 and LED 46 will be activated whenever sphere 20 leaves the proximity of sensor 22, when switch 66 is in the positive position, regardless of whether sphere 20 is positioned over sensor 24 or is disposed intermediate sensors 22 and 24.

Brief changes in the position of sphere 20, i.e minor fluctuations in room pressure, such as caused by opening or closing a door, are prevented from activating piezoelectric horn 44 and LED 46 by time delay relay coil 70 which requires a threshold period before energizing and activating such elements.

When the contact switch 40 is connected to LED 38, sensors 22 and 24 are deactivated, thereby preventing horn 44 and LED 46 from becoming active. In this configuration, current flows through LED 38 causing the LED to be illuminated, indicating that the alarm circuit 30 is essentially deactivated or "silenced".

From the above explanation, the theory of operation of detector 10 may be deduced for the situation in which switch 66 is positioned to select negative pressurization, i.e the preferred direction of air flow is into the room. In this situation, horn 44 and LED 46 will be activated, indicating an alarm condition, whenever sphere 20 leaves the proximity of sensor 24. Also, when switch 66 is set to the negative position, open winding 72A of the exhaust damper motor will be activated, regardless of the position of sphere 20, thereby causing the fan in the exhaust vent to actively draw out more air than the air being supplied to the room by the supply vent. As a result, makeup air from outside of the room flows directionally into the room.

It will be obvious to those skilled in the art that sensors 22 and 24 may be implemented with other than photoelectric diffuse sensors. For instance, sensors 22 and 24 may be implemented with photoelectric reflective sensors or proximity sensors which are magnetically activated by the presence of a metal covered sphere. It will also be obvious that circuit 60 may be configured to control devices other than the exhaust damper motor of the illustrative embodiment.

Figure 6:
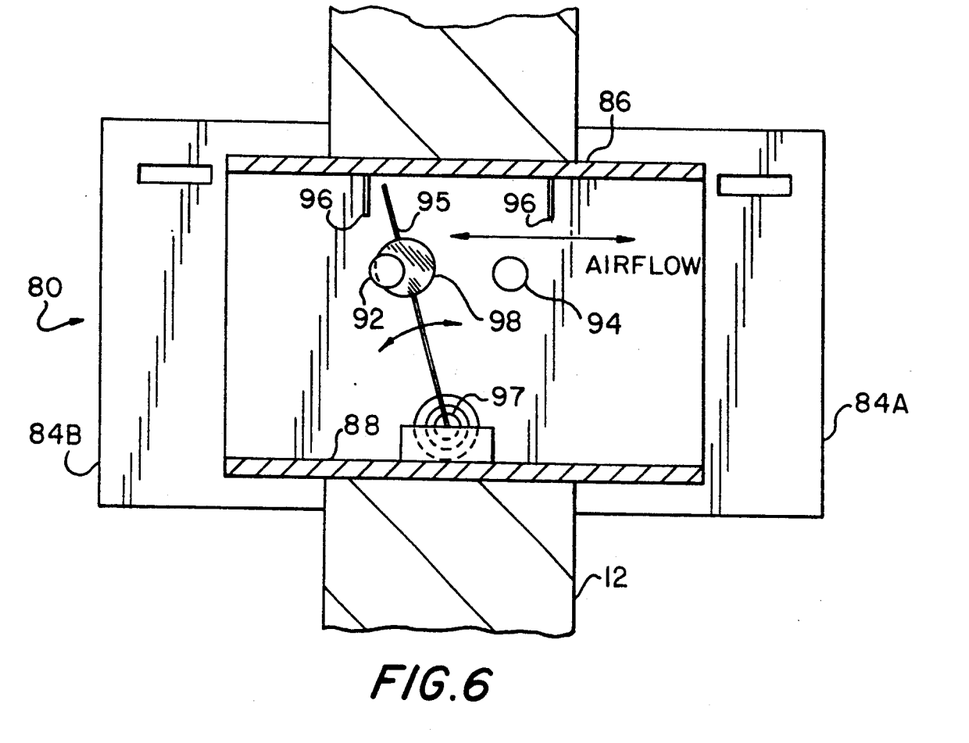
FIG. 6 is a side cut-away view of an air flow detector in accordance with a second embodiment of the present invention.
Figure 7:
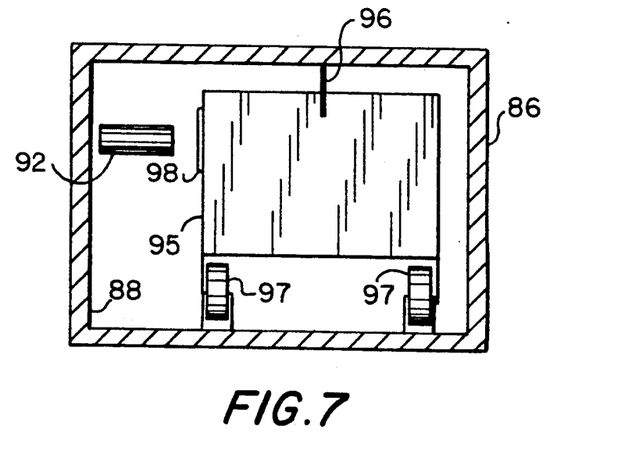
FIG. 7 is a front view of the air flow detector of FIG. 6.

Refering to FIGS. 6 and 7, an air flow direction detector 80, in accordance with a second embodiment of the present invention, comprises housing section 84A-B, conduit 86, sensors 92 and 94, stop pins 96 and circuits 30 and 60. Circuits 30 and 60 are identical to that of the first embodiment, except that sensors 22 and 24 are designed as sensors 92 and 94, respectively. Housing sections 84A-B are similar in shape and structure to housing sections 14A-B of detector 10, except for changes in dimension to accommodate conduit 86.

In the second embodiment, conduit 86 has a rectangular shape and may have a length of approximately 8 inches. A rectangular bore 88 extends through conduit 86 and may have a height of approximately 2 inches and a width of approximately 3 inches. Conduit 86 may be formed from a material similar to that of tube 16 of detector 10. A rectangular flap 95, formed from a thin, light-weight material, is movably coupled to the bottom surface of bore 88 by a pair of downwardly extending legs, each of which is coupled to a spiral spring 97, as shown in FIGS. 6 and 7. Spiral springs 97 allow flap 95 to pivot freely in either direction through bore 88, without bias. A disc-shaped target 98 is secured to a side edge of flap 95. A pair of stop pins 96 project downwardly from the upper interior surface of the bore 88 and limit the total possible range of displacement of flap 95 to an approximately 30° arc.

Sensors 92 and 94 are mounted to an interior side surface of rectangular bore 88. Sensors 92 and 94 are positions symmetrically about flap 95 in its upright, undeflected, position. When flap 95 is at its maximum deflection in either direction, and in contact with one of stop pins 96, target 98 covers and activates one of sensors 92 or 94, depending on the direction of air flow. In this manner, flap 95 and target 98 perform the same function as sphere 20 of detector 10.

The operation of air flow direction detector 80 is similar to that of detector 10. Air flows through bore 88, causing a deflection of flap 95 in the direction of air flow. When flap 95 reaches its maximum extent of travel, target 98 covers one of sensors 92 and 94 thereby activating that sensor. The interaction of sensors 92 and 94 with circuits 30 and 60 is identical to that previously explained with regard to sensors 22 and 24 of the first embodiment.

Figure 8:
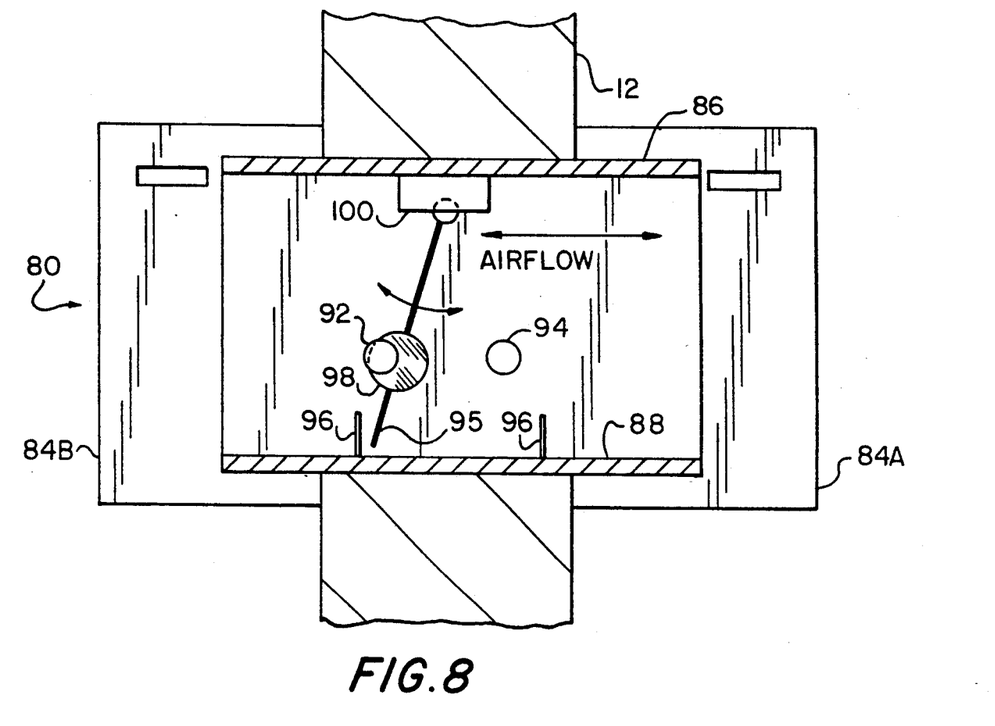
FIG. 8 is a side cut-away view of an alternate embodiment of the air flow detector of FIG. 6.
Figure 9:
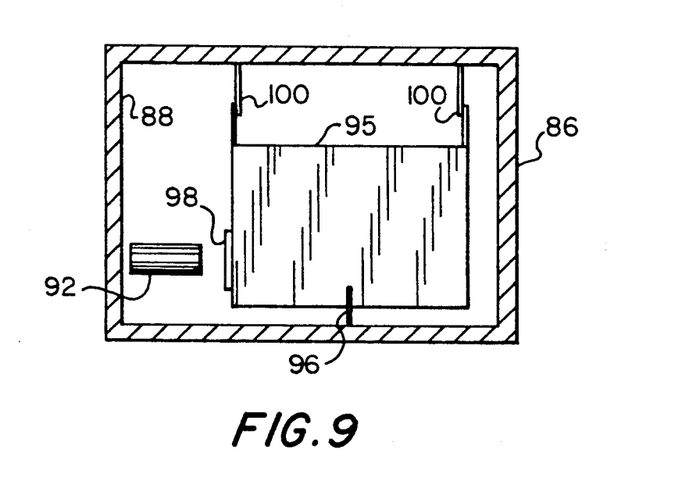
FIG. 9 is a front view of the air flow detector apparatus of FIG. 8.

Referring to FIGS. 8 and 9, an alternate embodiment of detector 80 is illustrated. In this alternative embodiment, flap 95 is pivotally coupled to the upper interior surface of bore 88 by a pair of supports 100 Sensors 92 and 94 are positioned lower on the interior side surface of bore 88 so as to similarly coact with flap 95 and target 98 as in the embodiment illustrated in FIGS. 6–7. Also, stop pins 96 project upwardly from the bottom surface of bore 88.

It may be appreciated from the foregoing explanation, that the illustrative embodiments of the present invention provide a device which allows the desired direction of air flow to be selected and visually monitored and which actuates an alarm, or similar device when the air flow direction detected by the device is other than the one selected.

Having thus described one particular embodiment, various alterations, modifications and improvements will readily occur to those skilled in the art. Such alterations, modifications and improvements as are made obvious by this disclosure are intended to be part of this disclosure though not expressly stated herein, and are intended to be within the spirit and scope of the invention. Accordingly, the foregoing description is intended to be explary only and not limiting. The invention is limited only as defined in the following claims and equivalents thereto.

What is claimed:

1. An apparatus for detecting the flow direction of a fluid comprising:

a conduit extending along a horizontal plane having an inlet/outlet openings at each end and adapted to receive a fluid moving in either direction of said conduit;

a detecting element disposed within the conduit and movable in the direction of a fluid flow, the detecting element being in direct contact with the fluid;

sensing means, coupled to the conduit, for determining when the detecting element reaches a predetermined position within the conduit; and circuit means, coupled to the sensing means, for indicating the direction of fluid flow through the conduit.

2. A flow direction detecting apparatus as set forth in claim 1 wherein the conduit comprises a cylindrical tube having first and second open ends and a smooth cylindrical bore extending therethrough.

3. A flow direction detecting apparatus as set forth in claim 2 wherein the detecting element comprises a lightweight sphere having a smooth exterior surface and being movable in the direction of fluid flow.

4. A flow direction detecting apparatus as set forth in claim 2 wherein the sensing means comprises first and second optical sensors disposed adjacent the first and second ends, respectively, of the cylindrical tube and exposed to the interior of the cylindrical bore.

5. A flow direction detecting apparatus as set forth in claim 4 wherein the first and second optical sensors comprise photoelectric diffuse sensors.

6. A flow direction detecting apparatus as set forth in claim 1 wherein the circuit means comprises means for monitoring a desired direction of fluid flow through the conduit and means for indicating when the direction of fluid flow through the conduit is different than the monitored direction.

7. A flow direction detecting apparatus as set forth in claim 1 wherein said conduit comprises a generally rectangular tube having first and second open ends and a rectangular bore extending therethrough.

8. A flow direction detecting apparatus as set forth in claim 7 wherein the movable element comprises a flap pivotally coupled to the rectangular bore and being deflectable in the direction of fluid flow.

9. A flow direction detecting apparatus as set forth in claim 8 wherein the sensing means comprises first and second optical sensors exposed to the interior of the rectangular bore and positioned symmetrically about the flap when the flap is not deflected.

10. A flow direction detecting apparatus as set forth in claim 9 wherein the detecting element further comprises a cover element attached perpendicularly to the flap and adapted to selectively cover one of the first and second optical sensors when the flap is deflected.

11. A flow direction detecting apparatus as set forth in claim 10 wherein the rectangular bore has an upper surface and wherein the flap is pivotally coupled to the upper surface of the rectangular bore.

12. A flow direction detecting apparatus as set forth in claim 10 wherein the rectangular bore has a lower surface and wherein the flap is pivotally coupled to the lower surface of the rectangular bore.

13. A flow direction detecting apparatus as set forth in claim 9 wherein the first and second optical sensors comprise photoelectric diffuse sensors.

14. A flow direction detecting apparatus as set forth in claim 1 further comprising means for limiting the motion of the detecting element within the conduit.

15. An apparatus for detecting the flow direction of a fluid comprising:
   a conduit extending along a horizontal plane having an inlet/outlet openings at each end and adapted to receive a fluid moving in either direction of said conduit;
   a detecting element disposed within the conduit and movable in the direction of a fluid flow, the detecting element being in direct contact with the fluid and in substantially continual contact with the conduit; and
   wherein said detecting element is a lightweight sphere having a smooth exterior surface and being movable in the direction of fluid flow so that said detecting element provides a visual indication of either said inlet/outlet openings as to which direction said fluid is flowing.

* * * * *